Patented Apr. 15, 1941

2,238,802

UNITED STATES PATENT OFFICE 2,238,802

PROCESS OF ALKYLATING HYDROCARBONS

Joe A. Altshuler and David H. Putney, Kansas City, Mo., assignors to Stratford Development Corporation, Kansas City, Mo., a corporation of Delaware Application November 6, 1939, Serial No. 303,105

5 Claims. (Cl. 196—10)

Our invention relates to a process of alkylating hydrocarbons and more particularly to a process of alkylating iso-paraffinic hydrocarbons to produce hydrocarbons suitable for use in an aviation or premium motor fuel.

It is known that iso-paraffinic hydrocarbons, such as iso-butane, iso-pentane and the like may be reacted with olefinic hydrocarbons in the presence of catalysts to produce alkylated iso-paraffinic hydrocarbons. For example, iso-butane may be reacted with butylene to produce iso-octane, the iso-octane being a typical hydrocarbon present in the desired motor fuel. The reaction is a condensation reaction which is exothermic and takes place in the presence of various catalysts such as sulphuric acid.

It has been found that an excess of the iso-paraffinic reactant must be maintained during the reaction in order to minimize the polymerization of the olefinic reactant. Olefins will tend to polymerize more readily than to condense with the iso-paraffinic hydrocarbons. It has been found, further, that the polymerization is reduced by conducting the reaction at reduced temperatures.

It has been found that the excess of the iso-paraffinic reactant must be maintained so that the olefinic constituent is but a fraction of the iso-paraffinic reactant present. A typical commercial installation, for example, maintains the proportion of the iso-paraffinic hydrocarbon to the olefinic hydrocarbon in the vicinity of 100 to 1 and in a reaction which is conducted at a temperature beween 45° and 60° F. With the above process conditions, a polymerization loss of about ten per cent is experienced. This polymerization loss can be reduced by lowering the temperature of the reaction and by increasing the concentration of the iso-paraffinic hydrocarbon with respect to the olefinic hydrocarbon.

The charging stock available for the process is a stabilized hydrocarbon fraction containing chiefly hydrocarbons of four carbon atoms per molecule, with minor amounts of $C_3$ and $C_5$ hydrocarbons. These hydrocarbons are obtained chiefly from the result of cracking operations, natural gasoline and field gases. The cracked hydrocarbons are the principal source of the olefinic hydrocarbons, while the natural gasoline fractions and field gas hydrocarbons are the principal source of the iso-paraffinic hydrocarbons. A blend of stabilized condensates from these sources, in which there is a molar excess of iso-paraffinic hydrocarbons over the olefinic hydrocarbons, is employed as the charging stock to the alkylation process. The specific gravity of the charging stock is about .6. The specific gravity of the sulfuric acid catalyst is about 1.8. In order to bring about intimate contact, it is necessary to intimately mix the relatively heavy sulfuric acid with the relatively light reactants. This is done by circulating the reactants and the catalyst from a reaction vessel or time tank, back to the vessel in a continuous stream. In order to maintain the desired excess of the iso-paraffinic hydrocarbons over the olefinic hydrocarbons in the reaction zone, it has been the practice to fractionate unreacted iso-paraffinic hydrocarbons from the reaction product and admix the iso-paraffinic hydrocarbon with the incoming feed to increase the proportion of the iso-paraffinic hydrocarbon to a point which will give the desired concentration of iso-paraffinic hydrocarbons in the reaction zone.

Inasmuch as the alkylation proceeds on a mol to mol ratio, it will be apparent that it has been necessary to handle a large quantity of unreacted iso-paraffinic hydrocarbons in the fractionating equipment.

One object of our invention is to provide a process of alkylating iso-paraffinic hydrocarbons in which we avoid the necessity of separating and recycling separated iso-paraffinic hydrocarbons.

Another object of our invention is to provide a proces of alkylating iso-paraffinic hydrocarbons in which the quantity of iso-paraffinic hydrocarbons recovered from the alkylated product and recycled is greatly reduced, thus saving a large proportion of the steam costs in fractionating and reducing the size of the fractionating equipment.

Another object of our invention is to provide a process of alkylating hydrocarbons which may be carried on with much smaller sized equipment.

Another object of our invention is to provide a process of alkylating hydrocarbons in which the desired ratio of the iso-paraffinic hydrocarbon to the olefinic hydrocarbon is maintained in a convenient, simple and expeditious manner.

Another object of our invention is to provide a process of alkylating hydrocarbons in which the exothermic heat of reaction is absorbed in the reaction zone.

Other and further objects of our invention will appear from the following description.

In the accompanying drawings which form part of the instant specification and are to be read in conjunction therewith:

Figure 1:
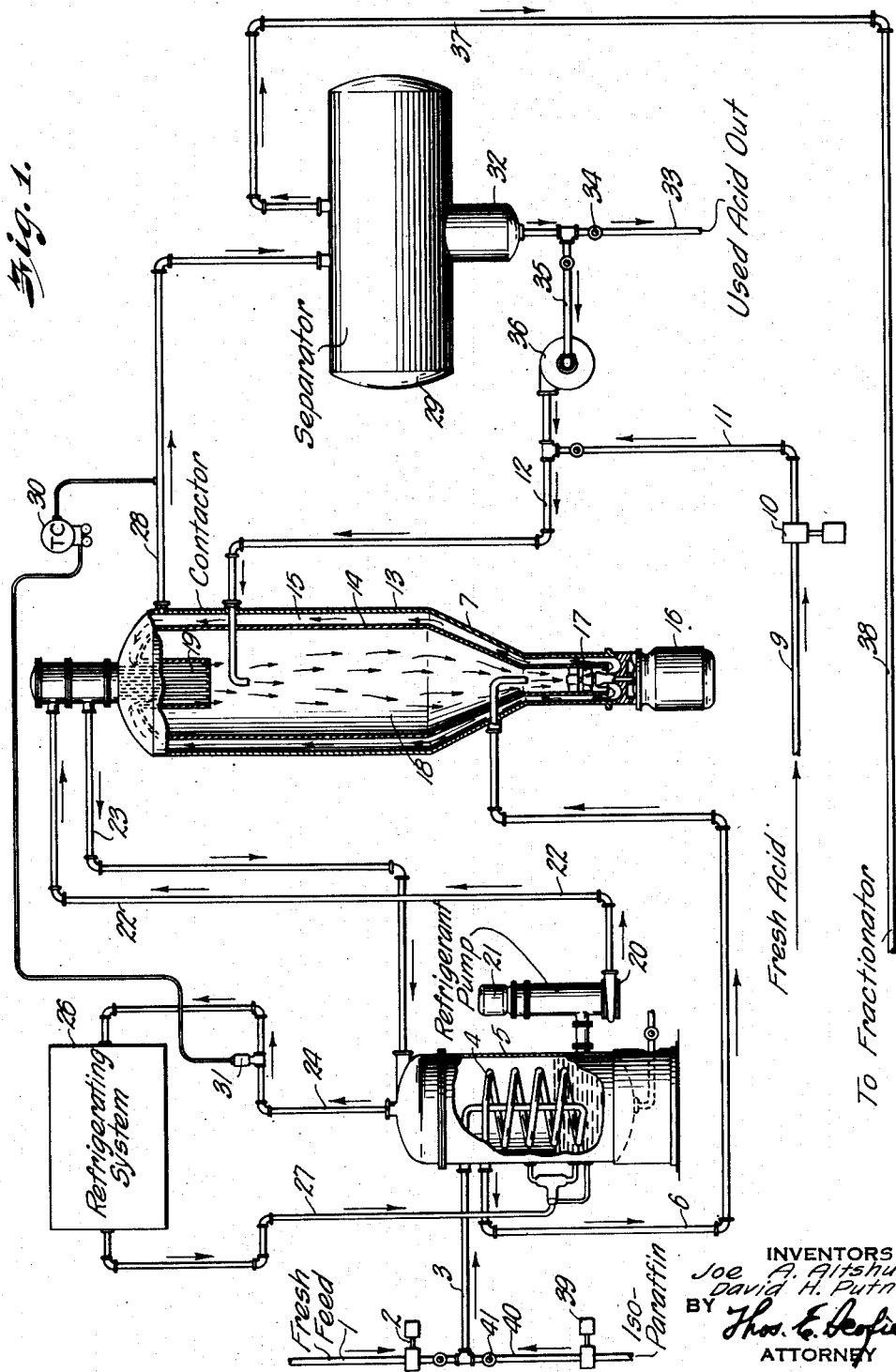
Figure 1 is a diagrammatic view of one form of apparatus capable of carrying out the method of our invention.

In general, our invention contemplates a process of alkylating hydrocarbons in which an olefinic hydrocarbon and a paraffinic hydrocarbon are reacted in the presence of a catalyst such as sulfuric acid, while flowing in a circuit of predetermined time capacity. We charge an iso-paraffinic hydrocarbon and an olefinic hydrocarbon, either admixed or separately, so that the charging stock will contain an excess of the iso-paraffinic hydrocarbon over that which would react with the olefinic hydrocarbon present.

We maintain a desired molar excess of the iso-paraffinic hydrocarbon over the olefinic hydrocarbon during the reaction, by establishing a rate of flow in the circuit which is a function of the excess of the iso-paraffinic hydrocarbon over the olefinic hydrocarbon in the charging stock. When the feed contains an increased amount of iso-paraffinic hydrocarbon, we maintain the desired molar ratio by reducing the circulation rate. When the quantity of the iso-paraffinic hydrocarbon in the feed is reduced, we maintain the desired ratio in the reaction zone by increasing the rate of circulation. In this manner, we are enabled to provide a very flexible process capable of taking care of a wide variety of compositions of charging stock by the simple expedient of controlling the rate of flow in the closed circuit and without the necessity of separating iso-paraffinic hydrocarbons from the alkylated material and recycling the separated iso-paraffinic hydrocarbons to the feed.

It is always necessary to charge a molar excess of the iso-paraffinic hydrocarbon over the olefinic hydrocarbon. It is always necessary to have a huge excess of iso-paraffinic hydrocarbon over the olefinic hydrocarbon in the reaction zone in order to promote the condensation reaction for the formation of the alkylated iso-paraffinic hydrocarbons and to mitigate the polymerization of the olefins. Alternatively, we contemplate establishing a process with a very high rate of flow in the closed circuit and taking care of variations in charging stock, that is, controlling the process within minor ranges by the addition of amounts of iso-paraffinic hydrocarbons to the feed. We also contemplate the control of the process by varying the circulation rate to accommodate for changes in the composition of the charging stock. We have found that unusual savings and unexpected reduction in the size of apparatus can be accomplished by maintaining the rate of flow in the closed circuit so that the reactants will traverse the circuit at least once in 45 seconds.

More particularly, referring now to the drawings, feed is withdrawn from any suitable source through pipe 1 and pumped by pump 2 through pipe 3, through chiller coil 4 in refrigerant tank 5. It is understood, of course, that the incoming feed contains a mixture of an iso-paraffinic hydrocarbon and an olefinic hydrocarbon.

For purposes of illustration but not by way of limitation and for convenience in phraseology, we will refer to the iso-paraffinic hydrocarbon as iso-butane and we will refer to the olefinic hydrocarbon as butylene, it being understood that any of the iso-paraffinic hydrocarbons may be alkylated by means of any of the olefinic hydrocarbons. In speaking of molar quantities, we mean the number of mols of the olefinic hydrocarbon which will react with the number of mols of the iso-paraffinic hydrocarbon to produce the alkylated hydrocarbon. For example, when we speak of a molar excess of iso-paraffinic hydrocarbons, we mean that if the olefinic hydrocarbon is a diolefin, that there are sufficient mols of the iso-paraffinic hydrocarbon present to be alkylated by the diolefin and leave an excess of iso-paraffinic hydrocarbons.

The feed, of course, will contain an excess of iso-butane over butylene and, in this case, the system will be under sufficient pressure to maintain all hydrocarbons in the liquid phase. This pressure, as will be obvious to those skilled in the art, will vary according to the vapor pressure of the hydrocarbon mixture at the temperatures in the system.

The chilled mixture of iso-butane and butylene leaves the chilling coil 4 through pipe 6 and passes into the contactor 7. The catalyst which in this case is sulfuric acid from any suitable source, passes through pipe 9 and is pumped by pump 10 through pipe 11 for passage through pipe 12 into the contactor. The contactor is comprised by an outer shell 13 in which is spacedly mounted an inner shell 14, forming an annular space 15. A variable speed motor 16 is adapted to drive an impeller 17 taking suction from the space 18 within the inner shell 14. The impeller 17 discharges into the annular space 15. The arrangement is such that a high circulation rate and thorough mixing is obtained. The circulation rate, of course, is dependent upon the speed of the motor 16 which drives the impeller 17. The mixed catalyst and reactants pass upwardly as shown by the arrows in the annular space 15, and downwardly into the space 18 in contact with heat exchanger tubes 19. The refrigerant from the refrigerant tank is withdrawn by pump 20, driven by motor 21, and discharged through pipe 22 into the tubes 19. Expanded refrigerant is withdrawn from the tubes 19 through pipe 23 and returns to the refrigerant tank 5. The refrigerant vapors and gases leave the tank 5 through pipe 24 and pass to the refrigerating system 26 for recompression and cooling. The compressed, cooled refrigerant leaves the refrigerating system through pipe 27 and is returned to the refrigerant tank 5. The products of the reaction are withdrawn from the contactor through pipe 28 and passed to a separator 29. These products are alkylated material, excess iso-butane, acid and such unreacted hydrocarbons as may have existed in the feed, such as normal butane and the like. The temperature within the reaction zone is maintained by means of a temperature control device 30, which is adapted to control back pressure valve 31 in the vapor outlet pipe 24 from the refrigerant tank 5. As the temperature rises, valve 31 tends to open permitting a greater expansion of the compressed refrigerant fluid. As the temperature drops, valve 31 tends to close, increasing the back pressure upon the refrigerant tank and reducing the degree to which the compressed refrigerant fluid will expand.

The acid being heavier than the hydrocarbons, will quickly separate in separator 29 and is collected in a sump 32 from which it may be withdrawn through pipe 33 by opening valve 34, or passed to join the incoming fresh acid through pipe 35 and pump 36.

The alkylated hydrocarbons, unreacted hydrocarbons and excess iso-butane leave the separator through pipe 37 and pass to a fractionating tower (not shown) after being subjected to the customary washing and neutralization operations.

Iso-paraffins, as for example iso-butane from any suitable source may be pumped by pump 39 through line 40 controlled by valve 41 into the fresh feed passing to the process when it is desired to control the process in part by the addition of iso-butane to the charge instead of completely controlling the process by variation of the contactor circulation. The contactor circulation can be controlled by changing the impeller 17 to one having different pitched blades, or by varying the speed of the motor 16. Iso-butane may be added to the incoming feed when the charging stock is poorer in iso-butanes than desired.

We indicated above that there must be a molar excess of iso-butane over butylene in the charge. This is true, of course, only for the continuous process. If the charge is poorer in iso-butane than the correct molar ratio for the reaction, the iso-butane in the circulating system will not be replaced as fast as it is consumed by the reaction with the result that it will become depleted to such a point that the desired concentration for the reaction cannot be maintained. It will be seen, therefore, that, for a continuous process, the charging stock must have at least the correct molar amount of iso-butane with respect to the molar amount of butylene for the reaction.

The rate of feed should be such that it will completely fill the volumetric capacity of the contactor, within a predetermined time which is the time of reaction. The time of reaction, of course, will vary, depending upon the temperature, the concentration of one reactant with respect to the other, the thoroughness or degree of mixing, the particular catalyst employed, the state of catalytic activity of the catalyst and the composition of the particular reactants. It will be appreciated, of course, that, in practice, pure reactants alone are not employed, but that other hydrocarbons such as normal butane, normal propane and normal pentane will be present. These inert hydrocarbons, which do not take part in the reaction, will reduce the concentration of the reactants and affect the size of contactor. For a commercial plant, a time of reaction varying between 10 minutes or lower and 45 minutes or higher, could be employed.

In order to obtain a better understanding of our process, we will illustrate it with specific examples. In the following illustration, since the molecular weight of the two reactants being used in this example, namely iso-butane and butylene, are 58 and 56 respectively, and further, since the gallons per mol of the butylene and iso-butane do not vary more than substantially 10 per cent, in order to simplify the example, we will illustrate ratios in terms of liquid volume rather than in terms of mols.

Let us assume that we desire a time of reaction of 30 minutes and that we have a contactor whose volumetric capacity over and above the volume occupied by the acid, is 210 gallons. It will be clear that we will have to charge 7 gallons per minute into this contactor in order to obtain the time of reaction of 30 minutes. Let as assume, further, that the feed which is being charged at the rate of 7 gallons per minute contains 3 gallons of butylene and 4 gallons of iso-butane, giving an excess of iso-butane of one-third over the amount of butylene.

Let us assume, further, that the speed of the impeller 17 is such that it will circulate 210 gallons in addition to the volume of acid, once every 3 minutes. It will be apparent, therefore, that the circulating ring will contain a flowing stream of 70 gallons per minute of iso-butane. Charging the feed of 3 gallons of butylene and 4 gallons of butane into the stream of 70 gallons of iso-butane will result in a concentration of iso-butane to butylene of 24.7 to 1. This, it will be apparent, is too low to produce the desired result. It was pointed out above that, in order to reduce polymerization, that the quantity of iso-butane must be greatly in excess of the butylene, as for example, in the neighborhood of 100 parts of iso-butane to one part of butylene. Since we have a ratio of only 25 parts of iso-butane to one part of butylene, we must enrich the feed with additional iso-butane. This additional iso-butane must be obtained from an external source or from fractionation from the products removed from the reaction zone.

The rate at which the charge can be fed into the circulating ring is fixed at 7 gallons per minute in order to obtain the desired time of reaction. Since a charge containing 3 gallons of butylene and 4 gallons of iso-butane will produce a concentration of iso-butane to butylene of about 25 to 1, we must obtain a ratio of iso-butane to butylene in the feed of 6.24 gallons of iso-butane to .76 gallon of butylene, in order to maintain the desired excess of iso-butane to butylene in the reaction zone of about 100 to 1 To do this, it will be necessary to reduce the rate of the incoming feed of the composition comprising 4 parts iso-butane and 3 parts olefin to 1.77 gallons per minute and add 5.23 gallons of iso-butane in order to make up the 7 gallons per minute composite feed.

Inasmuch as the supply of iso-butane available is usually limited, resort is had to fractionation, entailing the necessity of building fractionating equipment and the cost of running it. In practice, there are always large amounts of normal butane present in the reacting materials. In order to recycle iso-butane, it is necessary to fractionate iso-butane from normal butane. Since there is only 10.8° C. difference in the boiling points of normal butane and iso-butane, the fractionation task is a difficult one requiring a fractionating tower having a large number of plates with high reflux ratio and attendant high steam cost. It will also be obvious that the rate of charge of the fresh feed is greatly reduced, thus in effect cutting down the capacity of the plant.

Since, in the arrangement which we have shown, it is possible to turn over the contents of the contactor in a very short period of time, according to our process we simply increase the speed of circulation of the material within the contactor so that the entire contents of the contactor are turned over within such time as, considering the proportion of iso-butane to butylene in the fresh feed, the desired ratio of 100 parts of iso-butane to butylene is achieved.

With the same process factors outlined above, that is, with a charge at the rate of 7 gallons per minute, containing 4 gallons of iso-butane and 3 gallons of butylene, and with a time of reaction of 30 minutes in a contactor having a capacity of 210 gallons of reactants over and above the acid catalyst present, if we circulate at such a rate as to turn over the contents of the contactor within 42½ seconds, that is, increase the speed of the impeller so that it will be circulating 296 gallons per minute, then we need add no iso-butane to the fresh feed in order to obtain the desired concentration of iso-butane to butylene of 100 to 1.

Figure 2:
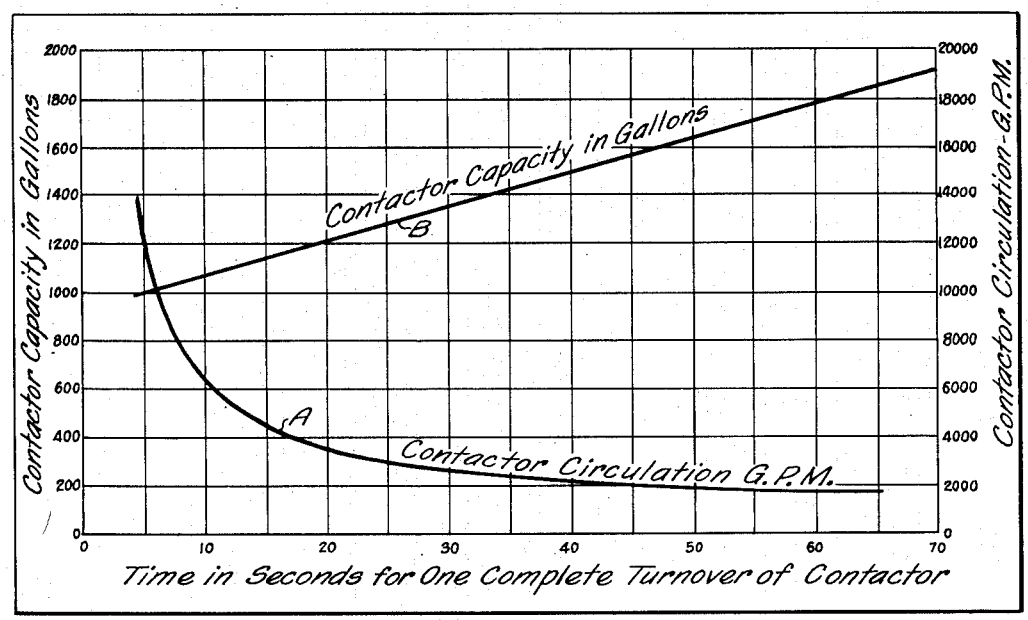
Figure 2 is an illustrative curve showing the relation between capacity of contactor in gallons, contactor circulation in gallons per minute, and seconds required for one complete turnover of contactor contents for a fixed time of reaction and reactant ratio.
Figure 3:
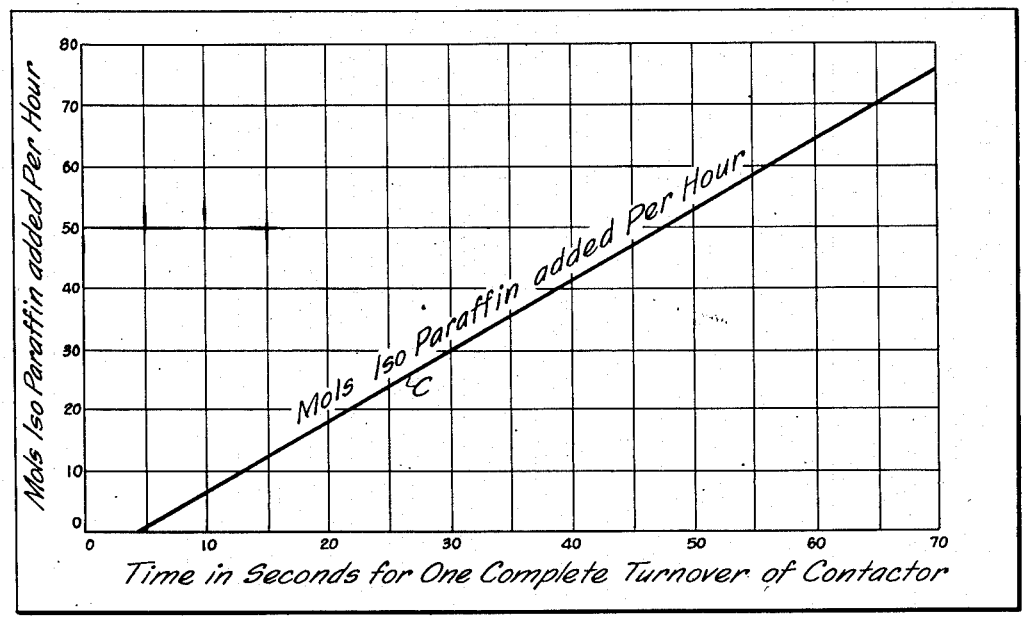
Figure 3 is an illustrative curve showing the variation of recycled, separated iso-paraffin as a function of circulation rate, to maintain the same process conditions as the curves in Figure 2.

Referring now to Figure 2, we have shown a curve A in which contactor circulation in gallons per minute to obtain a ratio of butane to butylene of 100 to 1 is plotted against time in seconds, for one complete turnover of a contactor of a given size. Curve B is a curve of contactor capacity in gallons plotted against time for a given fixed time of reaction. Curves A and B take into account variations in total volume of feed due to the quantity of iso-butane which it is necessary to add to the feed as shown in Figure 3. Figure 3 is a curve, showing mols of iso-butane which it is necessary to add in order to bring the ratio of iso-paraffinic hydrocarbons to olefinic hydrocarbons in the contacting zone to 100 to 1.

For example, if we have a contactor which has a capacity of 1800 gallons (on curve B) and we turn over the contents of this tank in 62 seconds, it will be necessary to circulate 1760 gallons per minute (curve A). With this rate of circulation, it will be necessary to add 68 mols of iso-butane per hour to the incoming feed. If we increase the circulation rate to circulate 13,900 gallons per minute (curve A) it will not be necessary to add any iso-paraffin (curve C) to maintain the desired ratio of 100 mols of iso-butane to one mol of butylene in the reaction zone. It will be noted, further, that a much smaller contactor can be employed, that instead of employing a contactor of 1800 gallon capacity, we may now employ a contactor of 990 gallons and still obtain the desired time of reaction. It will be apparent, further, that the reaction products withdrawn from the contactor will be richer in alkylated material, thus further reducing the load on the after neutralizing and fractionating equipment. By the same token, smaller quantities of acid are circulated and the cooling load is greatly reduced. In addition, the increased circulation rate effects a greater mixing effect, thus making the process more efficient.

The curves illustrated in Figures 2 and 3 are not to be confused with the examples given above. They are typical curves of an actual operation in which the charging stock contained about 3 per cent of C₃ and lighter hydrocarbons, and about 17 per cent of butylene, about 24 per cent of iso-butane, about 53 per cent of normal butane, and 3 per cent of C₅ hydrocarbons.

It will be clear, from the foregoing, that variations in charging stock can be accommodated for by varying the circulation rate without resorting to the necessity of adding additional iso-butane to the feed. The change of the circulation rate, of course, may be augmented by the addition of iso-butane through pump 39. The advantages of our process, however, are still present even though iso-butane is separated from the reaction products and recycled to the composite feed, inasmuch as smaller fractionation equipment may be employed.

It will be seen that we have accomplished the objects of our invention. We have provided an alkylation process by which a wide variety of charging stocks may be processed in a given equipment. We have provided a process in which, since there is an excess of iso-butane over the butylene in the feed, it will not be necessary to add additional iso-butane to the feed in order to obtain the desired concentration of iso-butane to butylene in the reaction zone. If desired to use an iso-butane separation tower as a control instead of relying solely upon circulation rates, we have provided a process in which this iso-butane separation tower may be kept to an economical small size. We have reduced the size of equipment to produce a given quantity of alkylated material and we have provided a process which can be operated more economically in that we have reduced the costs of steam consumption, refrigerant load and the necessity of handling large quantities of excess material.

It will be further clear from the foregoing that, in our process, the temperatures of the reactants are kept substantially uniform, inasmuch as the high circulation rate in the contactor will also give a high heat exchange rate with the refrigerating heat exchanger tubes 19. Then, too, because of the higher circulation rates in our contactor, we are enabled to employ a much smaller heat exchange surface for refrigeration.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. In a process of alkylation in which olefinic and iso-paraffinic hydrocarbons are reacted in the presence of a condensation catalyst while flowing in a circuit comprising a reaction zone into which reaction zone the iso-paraffinic and olefinic hydrocarbons are introduced in a feed in which the molar quantity of the iso-paraffinic hydrocarbon is greater than the molar quantity of the olefinic hydrocarbon, the improvement which comprises increasing the molar ratio of the iso-paraffinic hydrocarbon to the olefinic hydrocarbon in the reaction zone in excess of one hundred to one by increasing the rate of flow of the materials in the circuit such that they traverse said circuit in less than 70 seconds.

2. In a process of alkylation in which olefinic and iso-paraffinic hydrocarbons are reacted in the presence of a condensation catalyst while flowing in a circuit comprising a reaction zone into which reaction zone the iso-paraffinic and olefinic hydrocarbons are introduced in a feed in which the molar quantity of the iso-paraffinic hydrocarbon is greater than the molar quantity of the olefinic hydrocarbon, the improvement which comprises increasing the molar ratio of the iso-paraffinic hydrocarbon to the olefinic hydrocarbon in the reaction zone in excess of one hundred to one by increasing the rate of flow of the materials in the circuit such that they traverse said circuit in less than 45 seconds.

3. In a process of alkylation in which butylene and iso-butane are reacted in the presence of a sulfuric acid catalyst while flowing in a circuit comprising a reaction zone into which reaction zone the iso-butane and butylene are introduced in a feed in which the molar quantity of the iso-butane is greater than the molar quantity of the butylene, the improvement which comprises increasing the molar ratio of the iso-butane to the butylene in the reaction zone in excess of one hundred to one by increasing the rate of flow of the materials in the circuit such that they traverse said circuit in less than 45 seconds.

4. In a process of alkylation in which olefinic and iso-paraffinic hydrocarbons are reacted in the presence of a condensation catalyst while flowing in a circuit comprising a reaction zone into which reaction zone the iso-paraffinic and olefinic hydrocarbons are introduced in a feed in which the molar quantity of the iso-paraffinic hydrocarbon is greater than the molar quantity of the olefinic hydrocarbon, the improvement which comprises increasing the molar ratio of the iso-paraffinic hydrocarbon to the olefinic hydrocarbon in the reaction zone in excess of one hundred to one by increasing the rate of flow of the materials in the circuit such that they traverse said circuit in less than forty-five seconds, and removing the heat of the alkylation reaction in the reaction zone.

5. In a process of alkylation in which butylene and iso-butane are reacted in the presence of a sulfuric acid catalyst while flowing in a circuit comprising a reaction zone into which reaction zone the iso-butane and butylene are introduced in a feed in which the molar quantity of the iso-butane is greater than the molar quantity of the butylene, the improvement which comprises increasing the molar ratio of the iso-butane to the butylene in the reaction zone in excess of one hundred to one by increasing the rate of flow of the materials in the circuit such that they traverse said circuit in less than forty-five seconds, and removing the heat of the alkylation reaction in the reaction zone.

JOE A. ALTSHULER.
DAVID H. PUTNEY.